Dec. 28, 1948.  H. S. CLOYD  2,457,446

PUSH COMB

Filed July 12, 1944

Harold S. Cloyd

Inventor

Patented Dec. 28, 1948

2,457,446

UNITED STATES PATENT OFFICE 2,457,446

PUSH COMB

Harold S. Cloyd, Erie, Pa., assignor to National Organ Supply Company, Erie, Pa., a corporation of Pennsylvania Application July 12, 1944, Serial No. 544,573

1 Claim. (Cl. 132—21)

This invention relates to push combs.

It is among the objects of this invention to provide push combs that are molded, or die cast, directly to final shape and size, and particularly such combs whose constrictions more uniformly meet the requirements of the trade and are made more easily and at lower cost than is the case with push combs made according to the practice prevailing prior to this invention.

Another object is to provide push combs in accordance with the foregoing objects and which are made from synthetic resin plastics whose characteristics are such that the combs can be sterilized by immersion in boiling water without deformation or loss of desirable properties.

Figure 1:
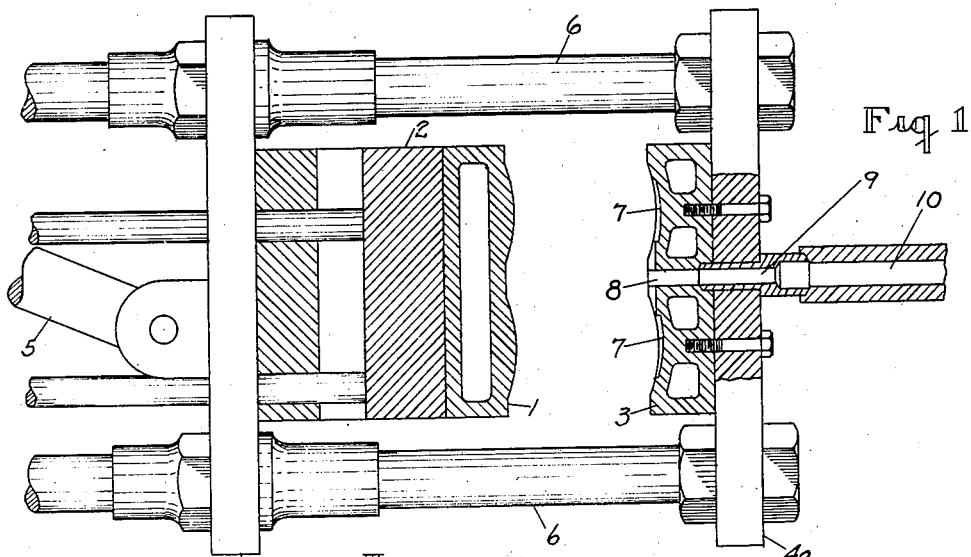
Figure 2:
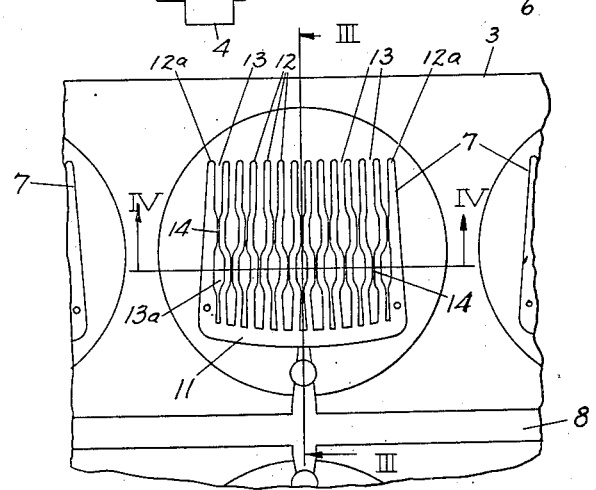

The invention will be described with reference to the accompanying drawings in which Fig. 1 is a vertical sectional view through a two-part mold for the multiple die casting of push combs in accordance with the present invention shown associated with certain elements of a conventional injection molding apparatus; Fig. 2 an enlarged front elevation of one of the cavities of the mold shown in Fig. 1; and Figs. 3 and 4 cross sectional views taken on lines III—III and IV—IV, respectively, Fig. 2.

Push combs of the type contemplated by the present invention comprise a back from which teeth extend that are so shaped as to provide at least one constriction between adjacent teeth, i. e., so that there is at least one relatively wide and at least one relatively narrow space between each pair of adjacent teeth. Such combs are, moreover, of generally spherical shape. Ideally the width of the space at the constriction between adjacent teeth should be about 0.005 inch, and it is held in the trade that push combs do not function properly if the opening at the constriction is greater than about 0.015 inch wide.

Push combs have been made heretofore by injection molding of thermoplastic resins. Prior to the present invention it was considered that these combs could not be molded directly to final form and size, particularly because of the extremely narrow spacing of the teeth at the constricted portion. That is, it was felt that push combs having constrictions between adjacent teeth to provide openings not exceeding about 0.015 inch, and preferably only about 0.005 inch, could not be made satisfactorily and economically by the use of dies adapted to provide such spacing. Consequently the practice has been to mold flat blanks with the constricted portions of the teeth spaced apart a distance several times that requisite in a push comb, and then to bring the flat blanks to spherical shape while contracting the spaces between the constrictions by pressing the blanks in reforming dies heated to bring the plastic to its deformation temperature.

The practice just described has not been entirely satisfactory because the reheating necessary for the reforming of the blanks relieves, at least to some extent, the shrinkage stresses created in molding the blank so that the reformed comb has less spring resistance than in its initial molded condition, and also it tends to return to its flat shape. Moreover, such a procedure, as compared with direct molding to final form and size, requires an additional molding operation with attendant labor and apparatus expense. Additionally, in that prior practice the general experience was that by the reforming operation the desired spacing of the teeth was not attained, it being generally true that a spacing of about 0.025 inch, which is greater than gives proper functioning, was about the best that could be obtained.

Experience showed also that the use of a flat blank was necessary in the prior practice because if the blank were molded to spherical form difficulties were met in reforming it to narrow the spaces between constrictions. Yet another disadvantage of prior practice was that the high polish of the blanks as originally molded was lost in the reforming operation. Obviously, the necessity for reforming the blanks made it requisite to use thermoplastic materials and in consequence the combs could not be sterilized without deformation by immersion in boiling water, thus precluding the use of synthetic resins not capable of reforming or having deformation temperatures high enough to permit such sterilization.

I have discovered, and it is upon this that the invention is predicated, that push combs of generally spherical shape having between adjacent teeth constrictions that are spaced for proper or ideal functioning, and which possess the original molding stresses, can be produced directly, i. e., by a single forming operation, by molding them from plastic materials in a mold having a cavity conforming to the spherical contour of the comb and comprising a back-forming cavity communicating with spaced and tapered tooth-forming cavities adapted to form teeth adjacent pairs of which are separated a substantial distance apart over portions of their length but which provide constricted portions the width of which gives the described spacing. In other words, the walls of the tooth forming portions of the mold cavity which form the constricted portions of adjacent teeth are so thin that shrinkage of the molded comb brings adjacent teeth to the desired spacing at the constricted portions. The width of such constricted portions, say from 0.005 to 0.015 inch, is so small that for the purposes of this invention such portions may be said to be substantially in contact.

The invention may be understood further with reference to the accompanying drawings which show it as applied to the multiple die casting of push combs by pressure injection molding, which constitute the preferred embodiment of the invention. In the conventional representation of a pressure injection molding apparatus shown, a die member 1 carried by a supporting block 2 is reciprocated toward and from another die member 3 by means of a reciprocating head 4 to which block 2 is connected and which is reciprocated through a power actuated toggle link 5, the reciprocating head being carried by guide rods 6 which are connected at one end to a supporting plate 4a that carried die 3, and at the other end to a pressure head, not shown.

Die member 3 is of the multiple cavity type provided with a plurality of die cavities 7 into which the plastic is forced from a gate 8 through a charging tube 9 and feed conduit 10 from a suitable source of melted plastic, not shown. The exact construction and operation of the mechanical details of the press form no part of this invention and are well understood by those skilled in the art.

In accordance with the invention the individual cavities 7 of die 3 are provided with a portion 11 which forms the back of the comb. Extending from cavity 11 are a series of cavities 12 adapted to form spaced teeth integral with the comb. As appears particularly from Fig. 3, cavities 12 taper inwardly and downwardly from the back-forming cavity 11, which, although unnecessary, is advantageous because tapered teeth afford the best functioning of these combs. The two outside tooth-forming cavities 12a are of somewhat greater section than the intermediate tooth-forming cavities 12 to provide the customary side members of the comb integral with and extending from the back.

Cavities 12 are formed between walls 13 integral with the mold which are of such width over a portion of their length that the teeth 12 will be spaced a substantial distance apart over a portion of their length. At a point intermediate their ends, the tooth forming walls are shaped, as by offsets 14, to form the customary constrictions between adjacent teeth. In accordance with the invention, therefore, the tooth-forming cavities are formed between walls having thick portions which space the teeth at their outer ends, and thinned portions 14 whose thickness is such that when the plastic injected into the mold cavity cools and shrinks there will be formed constrictions between adjacent teeth which provide the desired spacing, viz., between about 0.005 and 0.015 inch.

Figure 3:
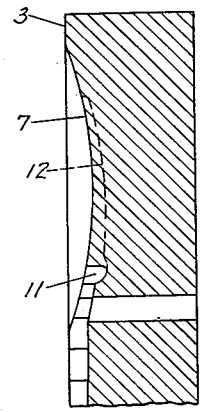
Figure 4:
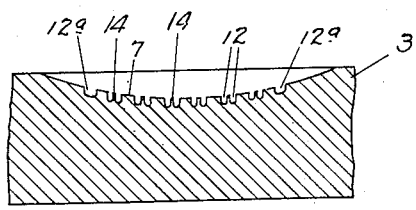

As appears particularly from Figs. 3 and 4, the mold cavity is curved both longitudinally and transversely so that the comb is spherically shaped as cast.

In this way, as I have found, it is possible to produce spherically shaped push combs directly and without reforming, with adjacent teeth providing constrictions separated by the distance desired in the trade. This eliminates the reforming operation that was necessary prior to my invention, with its attendant trouble and expense, and it affords the added advantage that the combs retain fully the springiness that is due to the stresses set up in shrinkage of the plastic which forms the comb. Furthermore, as I have found, the combs possess the high polish that is a result of the casting operation but which was lost in part during the reforming operation previously used.

Various thermoplastic resins may be used in practicing the invention such, for example, as cellulose acetate butyrate, which has been used heretofore for making push combs. That plastic was necessary for the making of such combs by the previously practiced method because it possessed a relatively low reforming temperature. The elimination of the reforming operation in the present invention means, however, that other plastics can be used with advantage. For example, and as indicated above, sterilization of cellulose acetate butyrate combs in boiling water has tended to cause them to lose their shape because they soften at temperatures as low as about 175° F. Hence it would be desirable to use plastics having higher softening temperatures, or which can not be deformed at the temperature of boiling water, 212° F. "Nylon" is such a material, but it could not be used to make combs by the pre-existing method described above because it could not be reformed. Nylon and other plastics may accordingly be used in the practice of the present invention.

Various modifications are, of course, permissible provided the essence of the invention is observed, namely, the forming of the constricted portions of adjacent teeth between mold walls so thin that the constricted portions of the teeth will be brought to the requisite spacing by the shrinkage of the plastic as it cools after the molding operation. Thus, in the embodiment shown the teeth are formed between spaced thickened wall portions 13 and 13a which cause the teeth in those portions to be spaced a substantial distance apart, the portions 13a of alternate walls being displaced longitudinally of the tooth-forming cavities with respect to the portions 13a of the intermediate teeth, as shown in Fig. 2. This results in successive pairs of tooth-forming cavities having reversely curved portions, as seen in the drawing, whereby the constriction formed by a given pair of teeth is offset longitudinally of the teeth with respect to the constrictions on each side formed by the teeth of the pair of adjacent teeth on either side. Of course, other contouring of the teeth than this may be used, if desired, within the scope of the invention.

According to the provisions of the patent statutes, I have explained the principle and mode of practicing my invention, and have illustrated and described what I now consider to represent its best embodiment. However, I desire to have it understood that, within the scope of the appended claim, the invention may be practiced otherwise than as specifically illustrated and described.

I claim:

A push comb injection molded in a single step from thermoplastic synthetic resin and comprising a back and spaced teeth extending from the back and curved longitudinally and transversely in the molding operation to provide a generally spherical contour to the comb surface, adjacent teeth being separated a substantial distance over a portion of their length and having portions forming a constriction therebetween where the teeth are in substantial contact solely as a result of the cooling shrinkage after the molding operation, and the comb retaining its original shrinkage stresses.

HAROLD S. CLOYD.

REFERENCES CITED

The following references are of record in the file of this patent:

UNITED STATES PATENTS

| Number | Name | Date |
| --- | --- | --- |
| D. 135,788 | Phillips | June 8, 1943 |
| 1,533,684 | Abeel | Apr. 14, 1925 |
| 1,660,441 | Gurnee | Feb. 28, 1928 |
| 1,763,653 | Harvey et al. | June 17, 1930 |
| 2,196,815 | Sawyer | Apr. 9, 1940 |
| 2,338,735 | Person | Jan. 11, 1944 |